3,290,298
THE LACTONE OF 3'-[4-FLUORO-4-ANDROSTENE-17-OL-3-ONE-17-YL]-PROPIONIC ACID AND PROCESS UTILIZED IN THE PREPARATION THEREOF

Robert Joly, Montmorency, Julien Warnant, Neuilly sur-Seine, and Roland Bardoneschi, Le Vert Galant, France, assignors to Roussel-UCLAF, Paris, France, a corporation of France No Drawing. Filed Dec. 11, 1964, Ser. No. 417,764
Claims priority, application France, Jan. 30, 1961, 851,139
11 Claims. (Cl. 260—239.57)

This application is a continuation-in-part application of our copending, commonly assigned application Serial No. 169,097, filed January 26, 1962, now abandoned.

The invention relates to an improved process for the preparation of 3-keto-4-fluoro-$\Delta^4$-steroids. The invention also relates to novel 3-keto-4-fluoro-$\Delta^4$-steroids and intermediates thereof.

In the copending, commonly assigned United States patent application Serial No. 94,980, filed March 13, 1961, now abandoned, there is described a process for the preparation of 3-keto-4-fluoro-$\Delta^4$-steroids which comprises reacting a 3-keto-$\Delta^4$-steroid with a secondary amine to form 3-enamino-$\Delta^{3,5}$-steroids, reacting the latter with perchloryl fluoride in a solvent such as aqueous dimethylformamide or methanol to form 3-keto-4-fluoro-$\Delta^5$-steroids and isomerizing the latter under acidic conditions to form the 3-keto-4-fluoro-$\Delta^4$-steroids.

The process of the said copending application does not always give high yields. The reaction of the 3-enamines of 3-keto-$\Delta^4$-steroids at normal temperatures in a neutral or acidic medium often leads to a mixture of 4-fluoro-$\Delta^4$ and 4-fluoro-$\Delta^5$-steroids whose separation is difficult. Also, the isomerization step in various acidic media such as hydrochloric acid in dimethylformamide or perchloric acid in methanol is incomplete or difficult if the steroid has a labile configuration. Moreover, the acidic isomerization at room temperatures requires prolonged reaction times.

It is an object of the invention to provide an improved process for the preparation of 3-keto-4-fluoro-$\Delta^4$-steroids.

It is another object of the invention to provide novel 3-keto-4-fluoro-$\Delta^4$-steroids, particularly the lactone of 3'-[4-fluoro-$\Delta^4$-androstene-17$\beta$-ol-3-one-17$\alpha$-yl] - propionic acid.

It is a further object of the invention to provide novel intermediates for the preparation of 3-keto-4-fluoro-$\Delta^4$-steroids and particularly the 3-enamines of the lactone of 3'-[$\Delta^4$-androstene-17$\beta$-ol-3-one-17$\alpha$-yl]-propionic acid.

These and other objects and advantages of the invention will become obvious from the following detailed description.

The improved process of the invention comprises reacting a 3-enamine of a 3-keto-$\Delta^4$-steroid wherein the enamino group is selected from the group consisting of di-lower alkyl amino, pyrrolidyl, piperidyl and morpholino with perchloryl fluoride in an aqueous organic polar solvent under basic conditions at temperatures below —25° C., preferably between —25° to —35° C. to form the corresponding 3-keto-4-fluoro-$\Delta^5$-steroid, isomerizing the latter by briefly refluxing in the presence of an alkaline agent to form the corresponding 3-keto-4-fluoro-$\Delta^4$-steroid and recovering the latter.

A preferred mode of the process comprises reacting a 3-enamine of a 3-keto-$\Delta^4$-steroid wherein the enamino group is pyrrolidyl with perchloryl fluoride at about —30° C. in the presence of a secondary amine, preferably pyrrolidine, in an aqueous organic polar solvent such as aqueous dimethylformamide, methanol or pyridine to form the corresponding 3-keto-4-fluoro-$\Delta^5$-steroid, isomerizing the later by refluxing in the presence of an alkali metal hydroxide such as sodium hydroxide after eliminating the excess perchloryl fluoride for a brief period of time, preferably from 5 minutes to 15 minutes, to form the corresponding 3-keto-4-fluoro-$\Delta^4$-steroid and recovering the latter. The process of the invention gives almost quantitative yields of 3-keto-4-fluoro-$\Delta^4$-steroids in a short time.

The starting 3-enamines of the 3-keto-$\Delta^4$-steroids can be prepared by procedures well known in the steroid field. For example, the 3-keto-$\Delta^4$-steroid may be reacted with the desired amine in the presence of a lower alkanol to form the desired 3-enamine of the 3-keto-$\Delta^4$-steroid.

The starting compounds may be the 3-enamino derivatives of 3-keto-$\Delta^4$-steroids of the spirostane, furostane, cholestane, pregnane or androstane series. Examples of suitable 3-keto-$\Delta^4$-steroids are 16$\alpha$-methyl-$\Delta^{4,9(11)}$-pregnadiene-17$\alpha$-ol-3,20-dione, progesterone, testosterone, $\Delta^4$-pregnene-17$\alpha$-ol-3,20-dione, 19-nor-testosterone, 17$\alpha$-acetoxy - progesterone, $\Delta^4$-pregnene-11$\beta$,17$\alpha$-diol-3,20-dione, 17$\alpha$ - ethynyl-19-nor-testosterone, 17$\alpha$-ethyl-19-nor-testosterone, 16$\alpha$-methyl-$\Delta^4$-pregnene-3,11,20-trione and the lactone of 3'-[$\Delta^4$-androstene-17$\beta$-ol-3-one-17$\alpha$-yl]-propionic acid. A preferred starting material is the lactone of 3'-[3-pyrrolidyl - $\Delta^{3,5}$ - androstadiene-17$\beta$-ol-17$\alpha$-yl]-propionic acid.

The 3-keto-4-fluoro-$\Delta^4$-steroids formed by the process of the invention may be transformed to the corresponding 3-keto-4-fluoro-$\Delta^{1,4}$-steroid by biological dehydrogenation or by ethoxalylation in the 2-position followed by bromination and dehydrobromination by a mixture of lithium bromide and lithium carbonate in dimethylformamide. The lactone of 3' - [4-fluoro-$\Delta^{1,4}$-androstadiene-17$\beta$-ol-3-one-17$\alpha$-yl]-propionic acid has anti-aldosterone activity when administered orally or subcutaneously.

In the following example there are described several preferred embodiments to illustrate the invention. However, it should be understood that the invention is not intended to be limited to the specific embodiments. The melting points are instantaneous melting points determined on the Kofler block and the temperatures are indicated in degrees Centigrade.

EXAMPLE

Step A.—Preparation of the lactone of 3'-[3-(N-pyrrolidyl) - $\Delta^{3,5}$ - androstadiene-17$\beta$-ol-17$\alpha$-yl]-propionic acid 10 gm. of the lactone of 3'-[$\Delta^4$-androstene-17$\beta$-ol-3-one-17$\alpha$-yl]-propionic acid were introduced and dissolved in 100 cc. of methanol by refluxing. After complete solution, 10 cc. of pyrrolidine were added. After boiling, a considerable crystallization appeared very rapidly. The mixture was allowed to boil two to three minutes and was iced. The compound which precipitated was isolated, vacuum filtered, washed with methanol, and finally dried.

10.7 gm., being a 93% yield, of the lactone of 3'-[3-(N-pyrrolidyl)-$\Delta^{3,5}$-androstadiene-17$\beta$-ol-17$\alpha$-yl] - propionic acid were thus obtained, having a melting point of 220° C. then 242° C. For analysis the compound was recrystallized from a mixture of methylene chloride and isopropyl ether. The melting point remained unchanged. The product, which is not described in the literature, had the following constants.

Specific rotation: $[\alpha]_D^{20}$=—150° (c.=0.5% dioxane).

I.R. spectrum: In accordance with the indicated structure showing the presence of a gamma lactone, of the enamine group, and absence of the 3-oxo-$\Delta^4$-group.

Microanalysis ($C_{26}H_{37}O_2N$): Molecular weight= 395.56. Calculated: C, 78.94%; H, 9.43%; N, 3.54%. Found: C, 78.7%; H, 9.4%; N, 3.6%. Ash: None.

The starting compound was prepared according to the process described by Cella et al., J. Am. Chem. Soc., vol. 79 (1957), page 4808.

*Step B.—Preparation of the lactone of 3'-[4-fluoro-Δ⁴-androstene-17β-ol-3-one-17α-yl]-propionic acid*

4 gm. of the lactone of 3'-[3-(N-pyrrolidyl)-Δ³,⁵-androstadiene-17β-ol-17α-yl]-propionic acid were placed in suspension in 80 cc. of methanol containing 10% of water. Several drops of pyrrolidine were added thereto and a current of perchloryl fluoride was bubbled through the suspension cooled to —30° C. The yellow suspension progressively clarified in order to give a complete solution from which a white product, the lactone of 3'-[4-fluoro-Δ⁵-androstene-17β-ol-3-one-17α-yl]-propionic acid was precipitated. After an hour and twenty minutes of bubbling, the solution was colorless and a current of nitrogen was passed therethrough in order to remove the excess of the reactant, perchloryl fluoride.

4 cc. of N sodium hydroxide solution was added and the mixture was heated to reflux for a period of ten minutes. The precipitate dissolved completely.

In order to destroy the small quantity of delactonized product, the solution was acidified with 4 cc. of 2 N hydrochloric acid solution and heated to reflux for one to two minutes and then, slowly, 120 cc. of water was added. The lactone precipitated and the solution was iced. The precipitate was separated by filtration, vacuum-filtered, washed with aqueous methanol, and dried in an oven. 3.12 gm., being 85% of theoretical, of the lactone of 3'-(4-fluoro-Δ⁴-androstene-17β-ol-3-one-17α - yl) - propionic acid, were obtained, having a melting point of 200 to 205° C. By recrystallizataion successively from a mixture of methylene chloride and isopropyl ether and then from a mixture of methylene chloride, and methanol, a pure, crystalline product in the form of rhombohedra was obtained. The pure product had an instantaneous melting point of 208° C. and a specific rotation $$[\alpha]_D^{20} = +60 \pm 5°$$

(c.=0.5% in chloroform).

I.R. spectrum: Showed the presence of a gamma lactone, a 3-oxo-4-fluoro-Δ⁴-group, and absence of the 3-oxo-Δ⁴-group.

U.V. spectrum (ethanol): λ max.=247–248 mμ; ε=14,700.

Analysis ($C_{22}H_{29}O_3F$): Molecular weight=360.45. Calculated: C, 73.3%; H, 8.11%; F, 5.27%. Found: C, 73.2%; H, 8.0%; F, 5.1%.

The lactone of the 3'-(4-fluoro-Δ⁴-androstene-17β-ol-3-one-17α-yl)-propionic acid was soluble in chloroform, slightly soluble in acetone and alcohol, very slightly soluble in ether, and insoluble in water.

This compound is not described in the literature.

*Step C.—Preparation of the lactone of 3'-[4-fluoro-Δ¹,⁴-androstadiene-17β-ol-3-one-17α-yl]-propionic acid*

The lactone of 3'-[4-fluoro-Δ⁴-androstene-17β-ol-3-one-17α-yl]-propionic acid, was dehydrogenated by its introduction into a culture of Corynebacterium simplex. There was obtained after isolation and crystallization from a mixture of ethyl acetate and ether, the lactone of 3'-[4-fluoro-Δ¹,⁴-androstadiene-17β-ol-3-one-17α-yl] - propionic acid in the form of a clear brown product having a melting point of 204° C. A supplementary purification by passage over neutral alumina and elution with benzene gave a colorless product having a melting point of 210–212° C.

The product for analysis was prepared by successive recrystallizations from a mixture of isopropyl ether and methylene chloride and then from a mixture of acetone and water. The product was crystalline in the form of parallelepipeds, having a melting point of 215–217° C. and a specific rotation $[\alpha]_D^{20} = +30° \pm 5°$ (c.=0.5% in chloroform).

The lactone of 3'-[-fluoro-Δ¹,⁴-androstadiene-17β-ol-3-one-17α-yl]-propionic acid was soluble in acetone and chloroform, slightly soluble in alcohol and in ether, and insoluble in water.

Analysis ($C_{22}H_{27}O_3F$): Molecular weight=358.44. Calculated: C, 73.71%; H. 7.59%; F, 5.30%. Found: C, 73.6%; H, 7.4%; F, 5.4%.

I.R. spectrum: Showed the presence of a gamma lactone and a conjugated ketone and a double bond and the absence of a 3-keto-4-fluoro-Δ⁴-group.

U.V. spectrum (ethanol): λ max. 244 mμ and 267 mμ (shouldering); ε=13,700.

This compound is not described in the literature.

Various modifications of the process of the invention may be made without departing from the spirit or scope thereof and it is to be understood that the invention is to be limited only as defined in the appended claims.

We claim:

1. A process for the preparation of 3-keto-4-fluoro-Δ⁴-steroids which comprises reacting the 3-enamine of a 3-keto-Δ⁴-steroid wherein the enamine group is selected from the group consisting of N-dilower alkyl amino-pyrrolidyl, piperidyl and morpholino with perchloryl fluoride in an aqueous organic polar solvent under basic conditions at temperature below —25° C. to form the corresponding 3-keto-4-fluoro-Δ⁵-steroid, isomerizing the latter by heating in an alkaline medium to form the corresponding 3-keto-4-fluoro-Δ⁴-steroid and recovering the latter.

2. The process of claim 1 wherein the perchloryl fluoride reaction is effected in the presence of a secondary amine.

3. The process of claim 1 wherein the said solvent is aqueous methanol.

4. The process of claim 1 wherein the reaction with perchloryl fluoride is effected at temperatures of about —30° C.

5. The process of claim 1 wherein the isomerization is effected in a dilute solution of an alkali metal hydroxide.

6. A process for the preparation of the lactone of 3'-[4-fluoro-Δ⁴-androstene-17β-ol-3-one-17α - yl] - propionic acid which comprises reacting the lactone of 3'-[3-(N-pyrrolidyl)-Δ³,⁵-androstadiene-17β-ol-17α-yl] - propionic acid with perchloryl fluoride in an aqueous polar solvent under basic conditions at about —30° C. to form the lactone of 3'-[4-fluoro-Δ⁵-androstene-17β-ol-3-one - 17α-yl]-propionic acid, isomerizing the latter by refluxing in a presence of a dilute solution of an alkali metal hydroxide to form the lactone of 3'-[4-fluoro-Δ⁴-androstene-17β-ol-3-one-17α-yl]-propionic acid and recovering the latter.

7. The process of claim 6 wherein the reaction with perchloryl fluoride is effected in the presence of pyrrolidine.

8. The lactone of 3'-[3-(N-pyrrolidyl)-Δ³,⁵-androstadiene-17β-ol-17α-yl]-propionic acid.

9. The lactone of 3'-[4-fluoro-Δ⁵-androstene-17β-ol-3-one-17α-yl]-propionic acid.

10. The lactone of 3'-[4-fluoro-Δ⁴-androstene-17β-ol-3-one-17α-yl]-propionic acid.

11. The lactone of 3'-[4-fluoro-Δ¹,⁴-androstadiene-17β-ol-3-one-17α-yl]-propionic acid.

No references cited.

LEWIS GOTTS, *Primary Examiner.*

ELBERT L. ROBERTS, *Assistant Examiner.*